(12) United States Patent
Okoroafor et al.

(10) Patent No.: US 7,473,754 B1
(45) Date of Patent: Jan. 6, 2009

(54) OPTICAL RESIN COMPOSITION

(75) Inventors: Michael O. Okoroafor, Export, PA (US); Robert A. Smith, Murrysville, PA (US); Marvin J. Graham, Monroeville, PA (US); Robert D. Herold, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/690,595

(22) Filed: Oct. 17, 2000

(51) Int. Cl.
*C08G 18/10* (2006.01)

(52) U.S. Cl. ............................. 528/59; 528/76; 528/77; 528/85; 526/321; 526/324; 526/347; 526/314; 526/227; 526/218.1; 526/219.6; 522/6; 524/81; 524/128

(58) Field of Classification Search .................... 528/59, 528/76, 77, 85; 526/321, 324, 347, 314, 526/227, 218.1, 219.6; 522/6; 524/81, 128
See application file for complete search history.

(56) References Cited

U.S. PATENT DOCUMENTS

| | | | |
|---|---|---|---|
| 2,370,567 A | 2/1945 | Muskat et al. ............... 260/463 |
| 2,403,113 A | 7/1946 | Muskat et al. ................. 260/78 |
| 3,361,706 A | 1/1968 | Meriwether et al. ........... 260/39 |
| 3,562,172 A | 2/1971 | Ono et al. .................... 252/300 |
| 3,567,605 A | 3/1971 | Becker ....................... 204/158 |
| 3,578,602 A | 5/1971 | Ono et al. .................... 252/300 |
| 3,600,359 A | 8/1971 | Miranda .................... 260/77.5 |
| 4,153,777 A | 5/1979 | Slagel .......................... 528/60 |
| 4,166,043 A | 8/1979 | Uhlmann et al. ............. 252/300 |
| 4,215,010 A | 7/1980 | Hovey et al. ................. 252/300 |
| 4,342,668 A | 8/1982 | Hovey et al. ................. 252/586 |
| 4,367,170 A | 1/1983 | Uhlmann et al. ............. 252/586 |
| 4,637,698 A | 1/1987 | Kwak et al. .................. 351/163 |
| 4,808,690 A | 2/1989 | Slagel .......................... 528/60 |
| 4,816,584 A * | 3/1989 | Kwak et al. .................... 544/71 |
| 4,826,977 A | 5/1989 | Heller et al. ................... 544/70 |
| 4,880,667 A | 11/1989 | Welch ........................ 427/160 |
| 4,931,219 A | 6/1990 | Kwiatkowski et al. ....... 252/586 |
| 4,931,220 A | 6/1990 | Haynes et al. ............... 252/586 |
| 5,066,818 A | 11/1991 | Van Gemert et al. ........ 549/389 |
| 5,274,132 A | 12/1993 | Van Gemert ................ 549/389 |
| 5,384,077 A | 1/1995 | Knowles ...................... 252/586 |
| 5,384,379 A | 1/1995 | Bader et al. ................. 526/286 |
| 5,405,958 A | 4/1995 | Van Gemert ................. 544/71 |
| 5,429,774 A | 7/1995 | Kumar ........................ 252/586 |
| 5,466,398 A | 11/1995 | Van Gemert et al. ......... 252/586 |
| 5,631,339 A | 5/1997 | Faler et al. ..................... 528/45 |
| 5,679,756 A | 10/1997 | Zhu et al. ....................... 528/65 |
| 5,693,738 A | 12/1997 | Okazaki et al. ................ 528/51 |
| 5,739,243 A | 4/1998 | Herold et al. ................ 526/325 |
| 5,811,506 A | 9/1998 | Slagel .......................... 528/64 |
| 5,818,096 A | 10/1998 | Ishibashi et al. ............. 351/163 |
| 5,916,987 A * | 6/1999 | Kobayashi et al. .......... 526/289 |
| 5,917,006 A | 6/1999 | Smith et al. .................. 528/373 |
| 5,932,681 A | 8/1999 | Herold et al. ................. 528/81 |
| 5,961,889 A | 10/1999 | Jiang et al. ................... 252/582 |
| 5,962,617 A | 10/1999 | Slagel .......................... 528/61 |
| 5,962,619 A | 10/1999 | Seneker et al. ................ 528/64 |
| 5,972,158 A | 10/1999 | Hoffmann et al. ........... 252/586 |
| 5,976,422 A | 11/1999 | Okoroafor et al. .......... 252/586 |
| 6,127,505 A | 10/2000 | Slagel .......................... 528/61 |

FOREIGN PATENT DOCUMENTS

| | | |
|---|---|---|
| DE | 23 61 769 | 6/1975 |
| EP | 490 777 A1 | 6/1992 |
| EP | 0 802 208 A1 | 10/1997 |
| EP | 0 803 504 A2 | 10/1997 |
| JP | 62195383 A | 8/1978 |
| JP | 03079614 | 4/1991 |
| JP | 06-123858 | 5/1994 |
| JP | 11-170387 | 6/1999 |

OTHER PUBLICATIONS

American Society for Testing and Materials, *Standard Test Method for Index of Refraction of Transparent Organic Plastics*, Designation: D 542-95, pp. 1-3.
American Society for Testing and Materials, *Standard Test Method for Indentation Hardness of Rigid Plastics by Means of a Barcol Impressor*, Designation: D 2583-95, pp. 1-3.

* cited by examiner

*Primary Examiner*—Kuo-Liang Peng
(74) *Attorney, Agent, or Firm*—Deborah M. Altman

(57) ABSTRACT

The present invention is directed to a novel polymerizable organic composition comprising one or more radically polymerizable monomers with at least one radically polymerizable monomer having at least two (meth)acryloyl groups that have backbone linkages selected from thiourethane linkages, dithiourethane linkages, combinations of thiourethane linkages and dithiourethane linkages. The present invention is also directed to polymerizates prepared from the polymerizable organic composition, shaped articles prepared from the polymerizable compositions, and photochromic articles that may be prepared from the polymerizable organic composition of the present invention.

13 Claims, No Drawings

OPTICAL RESIN COMPOSITION

BACKGROUND OF THE INVENTION

1. Field of the Invention

The present invention relates to polymerizable organic compositions and polymerizates obtained therefrom having a refractive index of at least 1.6, an Abbe number of at least 33 and an initial Barcol hardness of at least 1. More particularly, the present invention relates to certain polymerizable organic compositions comprising a radically polymerizable monomer having at least two (meth)acryloyl groups and backbone linkages selected from thiourethane linkages and/or dithiourethane linkages. The present invention also relates to photochromic articles prepared from such polymerizable compositions.

2. Description of the Prior Art

A number of organic polymeric materials, e.g., plastics, have been developed as alternatives and replacements for glass in applications such as optical lenses, fiber optics, windows and automotive, nautical and aviation transparencies. As used herein, the term 'glass' is meant to refer to silica-based inorganic glass. These polymeric materials can provide advantages relative to glass, including, shatter resistance, lighter weight for a given application, ease of molding and ease of dying. Representative examples of such polymeric materials include, poly(methyl methacrylate), thermoplastic polycarbonate and poly[diethylene glycol bis(allylcarbonate)].

The refractive indices of many polymeric materials are generally lower than that of glass. For example, the refractive index of poly[diethylene glycol bis(allylcarbonate)] is about 1.50, compared to that of high index glass, which can range, for example, from 1.60 to 1.80. When fabricating lenses to correct a given degree of visual defect, e.g., a correction for myopia, the use of a polymeric material having a lower refractive index will require a thicker lens relative to a material having a higher refractive index, e.g., high index glass. If the degree of correction required is substantial, as in the case of severe myopia, a lens fabricated from a low index polymeric material can be required to be very thick. A very thick lens may negate any benefit of reduction in weight relative to an equivalent degree of correction obtained from a higher refractive index lens, e.g., a high index glass lens. In addition, thicker optical lenses are not aesthetically desirable.

It is known that polymeric materials having refractive indices greater than 1.50 can be prepared from aromatic monomers and monomers containing halogens and/or sulfur atoms. The materials from which lenses, and in particular optical lenses, are fabricated can be categorized by their refractive indices. As is known to those of ordinary skill in the art, low indices typically include indices of refraction of from less than 1.50 through 1.53; middle indices comprise indices of refraction of from 1.54 through 1.57; and high indices commonly include indices of refraction of 1.58 and greater. Lenses prepared from polymeric materials having high refractive indices typically also have lower Abbe numbers (also known as nu-values). Lower Abbe numbers are indicative of an increasing level of chromatic dispersion, which is typically manifested as an optical distortion at or near the rim of the lens.

U.S. Pat. No. 5,384,379 to Bader et al. discloses sulfur-containing poly(meth)acrylates for optical applications. Although the materials disclosed by Bader et al. can be used as lenses to provide optical corrections, the poly(meth)acrylates disclosed generally provide an inadequate refractive index and chromatic dispersion. They also, generally, have poor impact resistance.

It is accordingly desirable then to identify new polymerizable organic compositions, which can be used to prepare transparent polymerizates, particularly optical lenses, that possess a combination of high refractive index and adequately high Abbe numbers. It is further desirable that these polymeric materials also possess physical properties, and in particular thermal properties, that are at least equivalent to and preferably better than those of lower index polymeric materials.

SUMMARY OF THE INVENTION

In accordance with the present invention, there is provided a polymerizable organic composition comprising one or more radically polymerizable monomers with at least one radically polymerizable monomer having at least two (meth)acryloyl groups that have backbone linkages selected from thiourethane linkages, dithiourethane linkages, combinations of thiourethane linkages and dithiourethane linkages.

The present invention is also directed to polymerizates prepared from the polymerizable organic composition of the present invention.

The present invention is further directed to shaped articles prepared from the polymerizable compositions of the present invention.

The present invention is yet further directed to photochromic articles that may be prepared from the polymerizable organic composition of the present invention.

DETAILED DESCRIPTION OF THE INVENTION

Unless otherwise indicated, all numbers or expressions referring to quantities of ingredients, reaction conditions, etc. used herein are to be understood as modified in all instances by the term "about."

The present invention is directed to a polymerizable organic composition comprising:

(a) a first radically polymerizable monomer having at least two (meth)acryloyl groups, said first monomer having backbone linkages selected from thiourethane linkages, dithiourethane linkages, combinations of thiourethane linkages and dithiourethane linkages, and optional backbone linkages selected from urethane linkages, urea linkages, thiocarbamate linkages and combinations thereof;

(b) optionally a second radically polymerizable monomer that is different than said first radically polymerizable monomer (a) and having at least two ethylenically unsaturated radically polymerizable groups selected from vinyl, allyl and (meth)acryloyl;

(c) optionally a third radically polymerizable monomer having at least one ethylenically unsaturated radically polymerizable group, which is different than monomer (a) and monomer (b), selected from the group consisting of,
  (i) a monoethylenically unsaturated monomer;
  (ii) an anhydride monomer having at least one ethylenically unsaturated group, which is different than monomer (i); and
  (iii) mixtures of monomers (i) and (ii); and (d) optionally a polythiol monomer having at least two thiol groups.

The present invention is also directed to a polymerizate of the polymerizable organic composition, which has a refractive index of from about 1.57 to about 1.80, preferably about 1.60 to about 1.75; an Abbe number of at least about 30, preferably at least about 33; and an initial Barcol hardness of at least 1. In a most preferred embodiment, the refractive index will be at least 1.6 (e.g., from 1.60 to 1.74). The refractive index is determined in accordance with American Standard Test Method (ASTM) number D 542-95. The Abbe number or nu-value is determined using an appropriate instrument, for example a Bausch & Lomb ABBE-3L Refractometer. The initial Barcol hardness (also commonly referred to as a zero second Barcol hardness) is determined in accordance with ASTM No. D 2583-95.

The first monomer (a) of the polymerizable composition has backbone linkages selected from thiourethane linkages (—NH—C(O)—S—), dithiourethane linkages (—NH—C(S)—S—) and combinations thereof. In addition, the first monomer may also optionally have backbone linkages selected from urethane linkages (—NH—C(O)—O—), urea linkages (e.g., unsubstituted urea linkages —NH—C(O)—NH— and/or substituted urea linkages —N($R_{14}$)—C(O)—NH— where $R_{14}$ may be a $C_1$-$C_4$ alkyl group), thiocarbamate linkages (—NH—C(S)—O—) and combinations thereof.

The first monomer is typically prepared in a two step process in which a precursor which forms the backbone of the first monomer is formed, followed by functionalization of the terminal portions of the precursor with (meth)acryloyl groups. The precursor of the first monomer is generally prepared from the reaction of (1) a polythiol monomer having at least two thiol groups; (2) a polycyanate monomer having at least two functional groups selected from isocyanate (—NCO), isothiocyanate (—NCS) and combinations thereof; and (3) optionally a reactive hydrogen material having at least two reactive hydrogen groups selected from hydroxyl, primary amine, secondary amine and combinations thereof. The thiol groups of the polythiol monomer (1) typically comprise at least 50 mole percent, e.g., at least 80 mole percent or at least 90 mole percent, of the total molar equivalents of thiol groups, hydroxyl groups, primary amine groups and secondary amine groups of said polythiol monomer and said reactive hydrogen material.

In the preparation of the precursor of the first monomer, the molar equivalents ratio of (NCO+NCS)/(SH+OH+$NH_2$+—NH—) is typically from 0.25:1 to 4:1, e.g., from 0.5:1 to 2:1 or from 0.8:1 to 1.2:1. Accordingly, the precursor of the first monomer may have terminal cyanate groups, e.g., isocyanate and/or isothiocyanate groups, or terminal reactive hydrogen groups selected from thiol, hydroxyl, primary amine, secondary amine and combinations thereof.

When the precursor of the first monomer has terminal cyanate groups, the terminal portions of the precursor may be functionalized by reaction with an alkyl (meth)acrylate having reactive hydrogen functionality selected from hydroxyl, thiol and primary amine. Typically the terminal cyanate portions of the precursor are functionalized by reaction with a hydroxyalky (meth)acrylate, such as 2-hydroxyethyl methacrylate. As used herein, by "(meth)acryloyl" and similar terms, such as "(meth)acrylate," is meant to refer to acryloyl groups, methacryloyl groups, and combinations of acryloyl groups and methacryloyl groups. As used herein, the term "cyanate," and similar terms, such as "polycyanate" and "cyanate group(s)," refers to isocyanate groups (—NCO), isothiocyanate groups (—NCS) and combinations of isocyanate and isothiocyanate groups.

When the precursor of the first monomer has terminal reactive hydrogen groups, e.g., terminal thiol groups, the terminal portions of the precursor may be functionalized by reaction with (meth)acrylic anhydride, (meth)acrylyl chloride or a (meth)acrylate monomer having functionality that is reactive with the terminal reactive hydrogen groups, for example glycidyl(meth)acrylate, isocyanato alkyl (meth)acrylate or hydroxy alkyl(meth)acrylate chloroformate esters, an example of which is hydroxyethylmethacrylate chloroformate ester.

The first monomer may be monomeric, oligomeric or polymeric, and consequently may have a wide range of molecular weights, for example, having a number average molecular weight (Mn) of from 500 to 15,000, or from 500 to 5,000, as determined by gel permeation chromatography using polystyrene standards. Typically, the molecular weight of the first monomer is selected such that the viscosity of the first monomer is not too high for the application in which it is used. For example, when used to prepare ophthalmic lenses, the first monomer typically has a viscosity at 25° C. of less than 800 centipoise (cPs), e.g., less than 500 cPs.

The polythiol monomer used to prepare the precursor of the first monomer has at least two thiol groups and may be selected from 2,5-dimercaptomethyl-1,4-dithiane, 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate), poly(ethylene glycol) di(3-mercaptopropionate). Mixtures of polythiols may be used to prepare the precursor of the first monomer.

A polythiol represented by the following general formula I, may also be used to prepare the precursor of the first monomer,

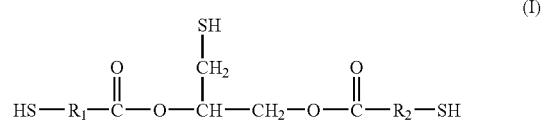

(I)

wherein $R_1$ and $R_2$ are each independently selected from the group consisting of straight or branched chain alkylene, cyclic alkylene, phenylene and $C_1$-$C_9$ alkyl substituted phenylene, and mixtures of said polythiol monomers. Examples of straight or branched chain alkylene from which $R_1$ and $R_2$ may be selected include, but are not limited to, methyl ene, ethylene, 1,3-propylene, 1,2-propylene, 1,4-butylene, 1,2-butylene, pentylene, hexylene, heptylene, octylene, nonylene, decylene, undecylene, octadecylene and icosylene. Examples of cyclic alkylenes from which $R_1$ and $R_2$ may each be selected include, but are not limited to, cyclopentylene, cyclohexylene, cycloheptylene, cyclooctylene, and alkyl substituted derivatives thereof. The divalent linking groups $R_1$ and $R_2$ may also be selected from phenylene and alkyl substituted phenylene, e.g., methyl, ethyl, propyl, isopropyl and nonyl substituted phenylene. In a preferred embodiment of the present invention, $R_1$ and $R_2$ are each methylene or ethylene.

The polythiol represented by general formula I may be prepared from an esterification or transesterification reaction between 3-mercapto-1,2-propanediol (Chemical Abstract Service (CAS) Registry No. 96-27-5) and a thiol functional carboxylic acid or carboxylic acid ester in the presence of a strong acid catalyst, e.g., methane sulfonic acid, with the concurrent removal of water or alcohol from the reaction mixture.

As used herein, the polythiol monomer described and named with reference to general formula I, e.g., thioglycerol bis(2-mercaptoacetate), is meant to include also any related co-product oligomeric species and polythiol monomer compositions containing residual starting materials. For example, when washing the reaction mixture resulting from the esterification of 3-mercapto-1,2-propanediol and a thiol functional carboxylic acid, e.g., 2-mercaptoacetic acid, with excess base, e.g., aqueous ammonia, oxidative coupling of thiol groups may occur. Such an oxidative coupling can result in the formation of oligomeric polythiol species having disulfide linkages, i.e., —S—S— linkages.

The polythiol monomer used to prepare the precursor of the first monomer may be a polythiol oligomer having disulfide linkages, which is prepared from the reaction of a polythiol monomer having at least two thiol groups and sulfur in the presence of a basic catalyst. The molar equivalent ratio of polythiol monomer to sulfur is from m to (m−1) wherein m is an integer from 2 to 21. The polythiol monomer may be selected from those examples as recited previously herein, e.g., 2,5-dimercaptomethyl-1,4-dithiane. The sulfur used may be in the form of, for example, crystalline, colloidal, powder and sublimed sulfur, and having a purity of at least 98 percent and preferably at least 99 percent.

Co-product oligomeric species can include oligomers of general formula I which can be described by general formula Ia:

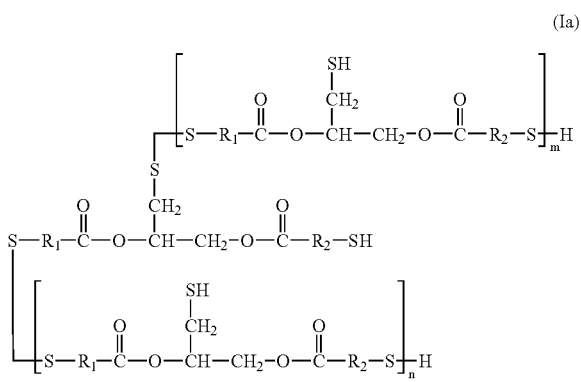

wherein $R_1$ and $R_2$ are as described above, n and m are independently an integer from 0 to 21 and n+m is at least 1. General formula Ia demonstrates that oligomerization can occur through disulfide bonds forming between any of the thiol groups in general structure I. Although all possibilities are not shown, general structure II is meant to represent all possible oligomers that can form from general structure I.

The basic catalyst used to prepare the polythiol oligomer having disulfide linkages may be selected from ammonia, amine and mixtures thereof. Examples of amines include, but are not limited to alkylamines, e.g., ethylamine and n-butylamine, dialkylamines, e.g., diethylamine, trialkylamines, e.g., triethylamine, morpholine, substituted morpholine, piperidine and substituted piperidine. The basic catalyst is typically present in an amount of from 0.001 to 1.0 mole percent, e.g., from 0.01 to 0.1 mole percent, based on the moles of polythiol monomer present at the beginning of the reaction. The basic catalyst may be charged together to a reaction vessel along with the polythiol monomer and sulfur, or may be added to the reaction vessel after the addition of the polythiol monomer and sulfur.

Synthesis of the polythiol oligomer having disulfide linkages may be conducted in the presence of a solvent, for example, halogenated hydrocarbons, such as chloroform, aliphatic hydrocarbons, such as hexane, aromatic hydrocarbons, such as toluene, and ethers, such as tetrahydrofuran. The polythiol oligomer may be prepared at a temperature ranging from room temperature to the boiling point of the solvent, e.g., from room temperature to 120° C. The preparation of polythiol oligomers having disulfide linkages that are useful in the present invention is described in further detail in U.S. Pat. No. 5,961,889, the disclosure of which is incorporated herein by reference in its entirety.

In an embodiment of the present invention, the polythiol oligomer having disulfide linkages may be selected from those represented by the following general formula II,

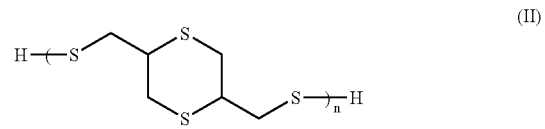

wherein y is an integer from 1 to 21. The polythiol oligomer represented by general formula II may be prepared from the reaction of 2,5-dimeracaptomethyl-1,4-dithiane with sulfur in the presence of a basic catalyst, as described previously herein.

The polycyanate monomer used to prepare the precursor of the first monomer may be selected from polyisocyanates having at least two isocyanate groups, isothiocyanates having at least two isothiocyanate groups and polycyanates having both isocyanate and isothiocyanate groups. Classes of polyisocyanates from which the polycyanate monomer may be selected include, but are not limited to: aliphatic polyisocyanates; ethylenically unsaturated polyisocyanates; alicyclic polyisocyanates; aromatic polyisocyanates wherein the isocyanate groups are not bonded directly to the aromatic ring, e.g., α,α'-xylene diisocyanate; aromatic polyisocyanates wherein the isocyanate groups are bonded directly to the aromatic ring, e.g., benzene diisocyanate; aliphatic polyisocyanates containing sulfide linkages; aromatic polyisocyanates containing sulfide or disulfide linkages; aromatic polyisocyanates containing sulfone linkages; sulfonic ester-type polyisocyanates, e.g., 4-methyl-3-isocyanatobenzenesulfonyl-4'-isocyanato-phenol ester; aromatic sulfonic amide-type polyisocyanates; sulfur-containing heterocyclic polyisocyanates, e.g., thiophene-2,5-diisocyanate; halogenated, alkylated, alkoxylated, nitrated, carbodiimide modified, urea modified and biuret modified derivatives of polyisocyanates belonging to these classes; and dimerized and trimerized products of polyisocyanates belonging to these classes. A particularly preferred sulfur containing polycyanate monomer is one of general formula (III):

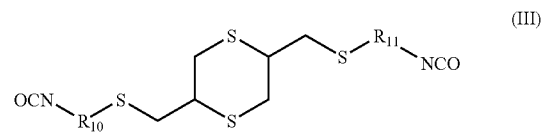

wherein $R_{10}$ and $R_{11}$ are each independently $C_1$ to $C_3$ alkyl.

Examples of aliphatic polyisocyanates that may be used to prepare the precursor of the first monomer include, but are not limited to, ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, 2,4,4,-trimethylhexamethylene diisocyanate, 1,6,11-undecanetriisocyanate, 1,3,6-hexamethylene triisocyanate, 1,8-diisocyanato-4-(isocyanatomethyl)octane, 2,5,7-trimethyl-1,8-diisocyanato-5-(isocyanatomethyl)octane, bis(isocyanatoethyl)-carbonate, bis(isocyanatoethyl)ether, 2-isocyanatopropyl-2,6-diisocyanatohexanoate, lysinediisocyanate methyl ester and lysinetriisocyanate methyl ester.

Examples of ethylenically unsaturated polyisocyanates include, but are not limited to, butene diisocyanate and 1,3-butadiene-1,4-diisocyanate. Alicyclic polyisocyanates that may be used to prepare the precursor of the first monomer may be selected include, but are not limited to, isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-(3-isocyanatopropyl)-5-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane and 2-isocyanatomethyl-2-(3-isocyanatopropyl)-6-(2-isocyanatoethyl)-bicyclo[2.2.1]-heptane.

Examples of aromatic polyisocyanates wherein the isocyanate groups are not bonded directly to the aromatic ring include, but are not limited to, bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, mesitylene triisocyanate and 2,5-di(isocyanatomethyl)furan. Examples of aromatic polyisocyanates, having isocyante groups bonded directly to the aromatic ring, that may be used to prepare the first monomer precursor, include, but are not limited to, phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, ortho-tolidine diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate and dichlorocarbazole diisocyanate.

Aliphatic polyisocyanates containing sulfide linkages that may be used to prepare the first monomer precursor may be selected from, for example, thiodiethyl diisocyanate, thiodipropyl diisocyanate, dithiodihexyl diisocyanate, dimethylsulfone diisocyanate, dithiodimethyl diisocyanate, dithiodiethyl diisocyanate, dithiodipropyl diisocyanate and dicyclohexylsulfide-4,4'-diisocyanate. Examples of aromatic polyisocyanates containing sulfide or disulfide linkages include, but are not limited to, diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene)-sulfide, diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate.

Aromatic polyisocyanates containing sulfone linkages that may be used to prepare the first monomer precursor may be selected from, for example, diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyl-diphenylsulfone-3,3'-diisocyanate and 4,4'-dichlorodiphenylsulfone-3,3'-diisocyanate.

Examples of aromatic sulfonic amide-type polyisocyanates that may be used to prepare first monomer precursor include, but are not limited to, 4-methyl-3-isocyanato-benzene-sulfonylanilide-3'-methyl-4'-isocyanate, dibenzenesulfonyl-ethylenediamine-4,4'-diisocyanate, 4,4'-methoxybenzenesulfonyl-ethylenediamine-3,3'-diisocyanate and 4-methyl-3-isocyanato-benzene-sulfonylanilide-4-ethyl-3'-isocyanate.

Classes of polyisothiocyanates that may be used to prepare the first monomer precursor include, but are not limited to: aliphatic polyisothiocyanates; alicyclic polyisothiocyanates, e.g., cyclohexane diisothiocyanates; aromatic polyisothiocyanates wherein the isothiocyanate groups are not bonded directly to the aromatic ring, e.g., α,α'-xylene diisothiocyanate; aromatic polyisothiocyanates wherein the isothiocyanate groups are bonded directly to the aromatic ring, e.g., phenylene diisothiocyanate; heterocyclic polyisothiocyanates, e.g., 2,4,6-triisothicyanato-1,3,5-triazine and thiophene-2,5-diisothiocyanate; carbonyl polyisothiocyanates; aliphatic polyisothiocyanates containing sulfide linkages, e.g., thiobis(3-isothiocyanatopropane); aromatic polyisothiocyanates containing sulfur atoms in addition to those of the isothiocyanate groups; halogenated, alkylated, alkoxylated, nitrated, carbodiimide modified, urea modified and biuret modified derivatives of polyisothiocyanates belonging to these classes; and dimerized and trimerized products of polyisothiocyanates belonging to these classes.

Examples of aliphatic polyisothiocyanates that may be used to prepare the first monomer precursor include, but are not limited to, 1,2-diisothiocyanatoethane, 1,3-diisothiocyanatopropane, 1,4-diisothiocyanatobutane and 1,6-diisothiocyanatohexane. Examples of aromatic polyisothiocyanates having isothiocyanate groups bonded directly to the aromatic ring include, but are not limited to, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanato-1,1'-biphenyl, 1,1'-methylenebis(4-isothiocyanatobenzene), 1,1'-methylenebis(4-isothiocyanato-2-methylbenzene), 1,1'-methylenebis(4-isothiocyanato-3-methylbenzene), 1,1'-(1,2-ethane-diyl)bis(4-isothiocyanatobenzene), 4,4'- diisothiocyanatobenzophenenone, 4,4'-diisothiocyanato-3,3'-dimethylbenzophenone, benzanilide-3,4'-diisothiocyanate, diphenylether-4,4'-diisothiocyanate and diphenylamine-4,4'-diisothiocyanate.

Carbonyl polyisothiocyanates that may be used to prepare the first monomer precursor include, but are not limited to, hexane-dioyl diisothiocyanate, nonaedioyl diisothiocyanate, carbonic diisothiocyanate, 1,3-benzenedicarbonyl diisothiocyante, 1,4-benzenedicarbonyl diisothiocyanate and (2,2'-bipyridine)-4,4'-dicarbonyl diisothiocyanate. Examples of aromatic polyisothiocyanates containing sulfur atoms in addition to those of the isothiocyanate groups, that may be used to prepare the first monomer precursor include, but are not limited to, 1-isothiocyanato-4-[(2-isothiocyanato)sulfonyl]benzene, thiobis(4-isothiocyanatobenzene), sulfonylbis(4-isothiocyanatobenzene), sulfinylbis(4-isothiocyanatobenzene), dithiobis(4-isothiocyanatobenzene), 4-isothiocyanato-1-[(4-isothiocyanatophenyl)-sulfonyl]-2-methoxybenzene, 4-methyl-3-isothicyanatobenzene-sulfonyl-4'-isothiocyanate phenyl ester and 4-methyl-3-isothiocyanatobenzene-sulfonylanilide-3'-methyl-4'-isothiocyanate.

The polycyanate monomer used to prepare the first monomer precursor may also be selected from polycyanate monomers having both isocyanate and isothiocyanate groups, which may be, for example, aliphatic, alicyclic, aromatic, heterocyclic, or contain sulfur atoms in addition to those of the isothiocyanate groups. Examples of such compounds, include, but are not limited to, 1-isocyanato-3-isothiocyanatopropane, 1-isocanato-5-isothiocyanatopentane, 1-isocyanato-6-isothiocyanatohexane, isocyanatocarbonyl isothiocyanate, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanato-4'-isothiocyanatodiphenyl sulfide and 2-isocyanato-2'-isothiocyanatodiethyl disulfide.

A reactive hydrogen material having at least two reactive hydrogen groups may optionally be used to prepare the precursor of the first monomer. The reactive hydrogen material may be selected from polyols, polyamines having at least two primary amine and/or secondary amine groups, and materials having both hydroxyl and amine functionality. As used herein, by "reactive hydrogen material" is meant a material having reactive hydrogen groups that are capable of forming covalent bonds with isocyanate and isothiocyanate groups.

Classes of polyols that may be used to prepare the precursor of the first monomer, include, but are not limited to: straight or branched chain alkane polyols, e.g., 1,2-ethanediol, 1,3-propanediol, 1,2-propanediol, 1,4-butanediol, 1,3-butanediol, glycerol, neopentyl glycol, trimethylolethane, trimethylolpropane, di-trimethylol propane, erythritol, pentaerythritol and di-pentaerythritol; polyalkylene glycols, e.g., diethylene glycol, dipropylene glycol and higher polyalkylene glycols such as polyethylene glycols having number average molecular weights of, for example, from 200 to 2000 grams/mole; cyclic alkane polyols, e.g., cyclopentanediol, cyclohexanediol, cyclohexanetriol, cyclohexanedimethanol, hydroxypropylcyclohexanol and cyclohexanediethanol; aromatic polyols, e.g., dihydroxybenzene, benzenetriol, hydroxybenzyl alcohol and dihydroxytoluene; bisphenols, e.g., 4,4'-isopropylidenediphenol; 4,4'-oxybisphenol, 4,4'-dihydroxybenzophenone, 4,4'-thiobisphenol, phenolphthlalein, bis(4-hydroxyphenyl)methane, 4,4'-(1,2-ethenediyl)bisphenol and 4,4'-sulfonylbisphenol; halogenated bisphenols, e.g., 4,4'-isopropylidenebis(2,6-dibromophenol), 4,4'-isopropylidenebis(2,6-dichlorophenol) and 4,4'-isopropylidenebis(2,3,5,6-tetrachlorophenol); alkoxylated bisphenols, e.g., alkoxylated 4,4'-isopropylidenediphenol having from 1 to 70 alkoxy groups, for example, ethoxy, propoxy, α-butoxy and β-butoxy groups; and biscyclohexanols, which can be prepared by hydrogenating the corresponding bisphenols, e.g., 4,4'-isopropylidene-biscyclohexanol, 4,4'-oxybiscyclohexanol, 4,4'-thiobiscyclohexanol and bis(4-hydroxycyclohexanol)methane.

Compounds containing one or more hydroxy and one or more thiol groups may be used to prepare the precursor of the first monomer. Examples of materials having both hydroxyl and thiol groups include, but are not limited to, 2-mercaptoethanol, 3-mercapto-1,2-propanediol, glycerin bis(2-mercaptoacetate), glycerin bis(3-mercaptopropionate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, trimethylolpropane bis(2-mercaptoacetate), trimethylolpropane bis(3-mercaptopropionate), pentaerythritol mono(2-mercaptoacetate), pentaerythritol bis(2-mercaptoacetate), pentaerythritol tris(2-mercaptoacetate), pentaerythritol mono(3-mercaptopropionate), pentaerythritol bis(3-mercaptopropionate), pentaerythritol tris(3-mercaptopropionate), hydroxymethyl-tris(mercaptoethylthiomethyl)methane, 1-hydroxyethylthio-3-mercaptoethylthiobenzene, 4-hydroxy-4'-mercaptodiphenylsulfone, dihydroxyethyl sulfide mono(3-mercaptopropionate and hydroxyethylthiomethyl-tris(mercaptoethylthio)methane.

Polyamines that may be optionally used to prepare the first monomer precursor have at least two functional groups selected from primary amine (—NH$_2$), secondary amine (—NH—) and combinations thereof. Preferably the optional polyamine has at least two primary amine groups.

The polyamine that may be used to prepare the first monomer precursor may be selected from any of the family of ethyleneamines, e.g., ethylenediamine (EDA), diethylenetriamine (DETA), triethylenetetramine (TETA), tetraethylenepentamine (TEPA), pentaethylenehexamine (PEHA), piperazine, i.e., diethylenediamine (DEDA), and 2-amino-1-ethylpiperazine. The optional polyamine may also be selected from one or more isomers of $C_1$-$C_3$ dialkyl toluenediamine, such as, 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine and mixtures thereof. Additional example of polyamines that may be used to prepare the first monomer precursor include, but are not limited to methylene dianiline and trimethyleneglycol di(para-aminobenzoate).

In an embodiment of the present invention, the optional polyamine reactant can generally be described as having one of the following general structures (IV-VI):

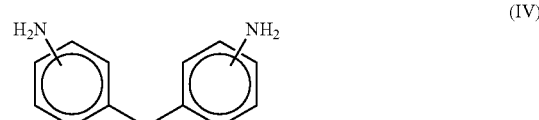

(IV)

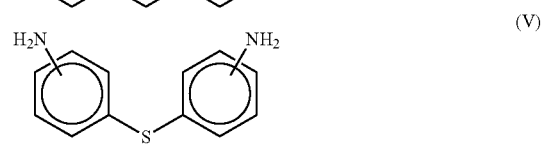

(V)

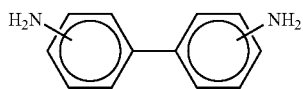
(VI)
Particularly preferred structures include one or more diamines represented by the following general formulas VII-XX,
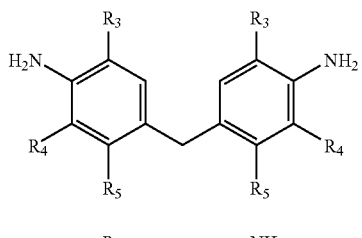
(VII)
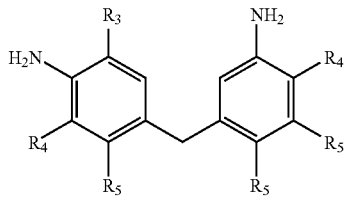
(VIII)
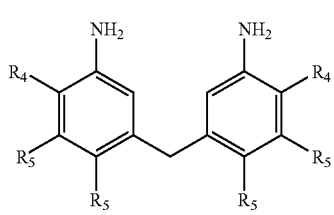
(IX)
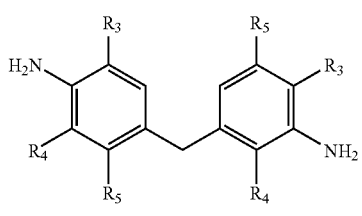
(X)
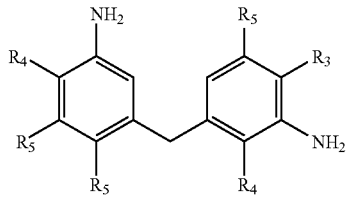
(XI)
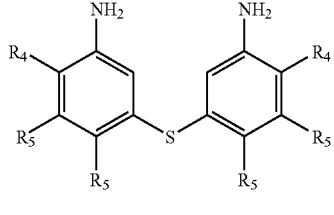
(XII)
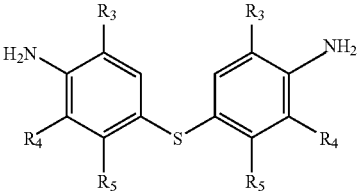
(XIII)
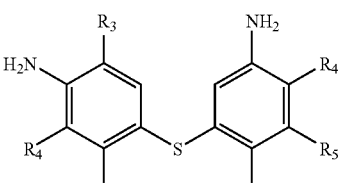
(XIV)
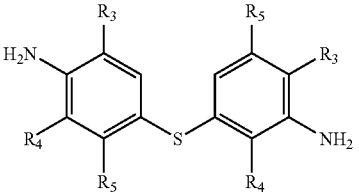
(XV)
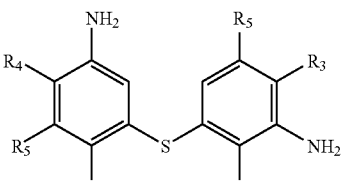
(XVI)
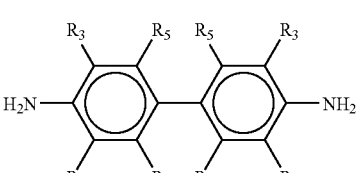
(XVII)
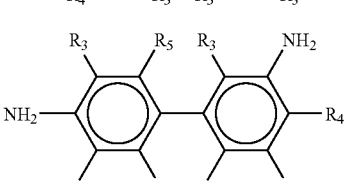
(XVIII)
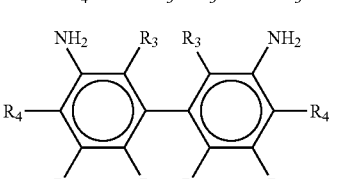
(XIX)
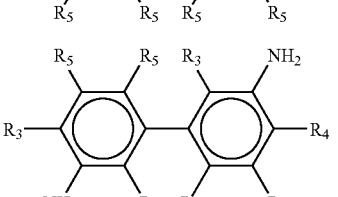
(XX)
wherein $R_3$ and $R_4$ are each independently $C_1$-$C_3$ alkyl, and $R_5$ is selected from hydrogen and halogen, e.g., chlorine and bromine. The diamine represented by general formula VII can be described generally as a 4,4'-methylene-bis(dialkylaniline). Specific examples of diamines represented by general formula VII include, but are not limited to, 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline) and 4,4'-methylene-bis(2,6-diethyl-3-chloroaniline). A preferred diamine represented by general formula VII is 4,4'-methylene-bis(2,6-diethyl-3-chloroaniline).

In another embodiment of the present invention, the polyamine reactant can generally be a 2,6 diamino toluene 3,5 dialkyl sulfide having the following general structures XXI:

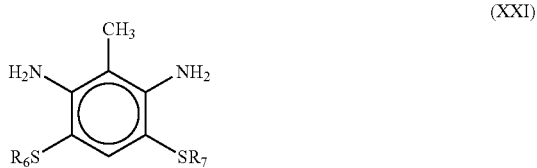

(XXI)

wherein $R_6$ and $R_7$, are linear, branched or cyclic $C_1$ to $C_{20}$ alkyl. Preferred compounds of general structure XXI are 2,6 diamino toluene 3,5 dimethyl sulfide and 2,6 diamino toluene 3,5 diethyl sulfide.

The diamine represented by general formula VII can be described generally as a 4,4'-methylene-bis(dialkylaniline). Specific examples of diamines represented by general formula VII include, but are not limited to, 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline) and 4,4'-methylene-bis(2,6-diethyl-3-chloroaniline). A preferred diamine represented by general formula VII is 4,4'-methylene-bis(2,6-diethyl-3-chloroaniline).

The precursor of the first monomer may be prepared in the presence of a catalyst. Catalysts that may be used in the preparation of the first monomer precursor include, for example, tertiary amines, e.g., triethylamine, triisopropylamine and N,N-dimethylbenzylamine, and organometallic compounds, e.g., dibutyltin dilaurate, dibutyltin diacetate and stannous octoate. Additional examples of tertiary amines are listed in U.S. Pat. No. 5,693,738 at column 10 lines 6 through 38, the disclosure of which is incorporated herein by reference. Additional examples of organometallic compounds useful as catalysts are listed in U.S. Pat. No. 5,631,339 at column 4, lines 26 through 46, the disclosure of which is incorporated herein by reference. Catalyst levels are typically less than 5% by weight, preferably less than 3% by weight and more preferably less than 1% by weight, based on the total weight of the polythiol monomer, polycyanate monomer and optional reactive hydrogen material.

The polymerizable composition of the present invention, may optionally comprise a second radically polymerizable monomer that is different that the first radically polymerizable monomer. The second monomer has radically polymerizable groups selected from vinyl, allyl and (meth)acryloyl.

In an embodiment of the present invention, the second monomer is an aromatic monomer having at least two vinyl groups. Examples of aromatic monomers that may be used in the polymerizable organic compositions of the present invention include, but are not limited to: divinyl benzene, e.g., 1,2-divinyl benzene, 1,3-divinyl benzene, 1,4-divinyl benzene and mixtures of structural isomers of divinyl benzene; diisopropenyl benzene, e.g., 1,2-diisopropenyl benzene, 1,3-diisopropenyl benzene, 1,4-diisopropenyl benzene and mixtures of structural isomers of diisopropenyl benzene; trivinyl benzene, e.g., 1,2,4-triethenyl benzene, 1,3,5-triethenyl benzene and mixtures of structural isomers of trivinyl benzene; divinyl naphthalene, e.g., 2,6-diethenyl naphthalene, 1,7-diethenyl naphthalene, 1,4-diethenyl naphthalene and mixtures of structural isomers of divinyl naphthalene; halogen substituted derivatives of divinyl benzene, diisopropenyl benzene, trivinyl benzene and divinyl naphthalene, e.g., 2-chloro-1,4-diethenyl benzene; and mixtures of such aromatic monomers. In a preferred embodiment of the present invention, the aromatic monomer is divinyl benzene.

In another embodiment of the present invention, the second radically polymerizable monomer (b) having at least two ethylenically unsaturated groups has (meth)acryloyl groups and is selected from:

(i) a monomer represented by the following general formula XXII,

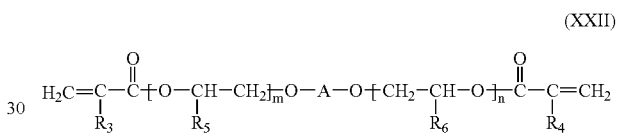

(XXII)

wherein m and n are each a positive number, the sum of m and n being from 0 to 70, preferably 2 to 40, and more preferably 5 to 20, $R_3$ and $R_4$ are each hydrogen or methyl, $R_5$ and $R_6$ are each hydrogen or $C_1$ to $C_2$ alkyl, and A is a divalent linking group selected from the group consisting of straight or branched chain alkylene (usually containing from 1 to 8 carbon atoms), cyclic alkylene (usually being 5 to 8 carbon atoms), phenylene, $C_1$-$C_9$ alkyl substituted phenylene, and a group represented by the following general formula XXIII,

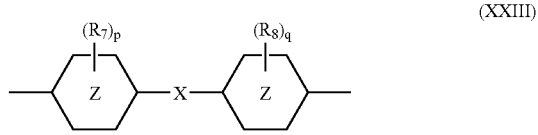

(XXIII)

wherein, $R_7$ and $R_8$ are each $C_1$-$C_4$ alkyl, chlorine or bromine, p and q are each an integer from 0 to 4,

represents a divalent benzene group or a divalent cyclohexane group and X is O, S, —S(O$_2$)—, —C(O)—, —CH$_2$—, —CH=CH—, —C(CH$_3$)$_2$—, —C(CH$_3$)(C$_6$H$_5$)— or

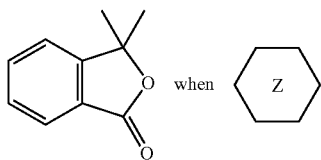

is the divalent benzene group, and X is O, S, —CH$_2$—, or —C(CH$_3$)$_2$— when

is the divalent cyclohexane group;

(ii) a bis[(meth)acryloyl-terminated]poly(ethylene glycol) monomer, that is different than monomer (i), having a number average molecular weight from 200 to 2,000 grams/mole; and (iii) a poly(meth)acryloyl terminated monomer represented by the following general formula XXIV,

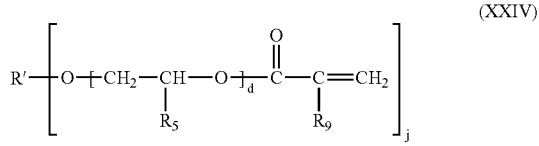

wherein R' is a polyvalent radical of a polyol, R$_9$ is hydrogen or methyl, R$_5$ is hydrogen or C$_1$ to C$_2$ alkyl, d is a number from 0 to 20, and j is a whole number from 3 to 6, preferably 3 to 4 and more preferably 3; and (iv) mixtures of monomers selected from the monomers (i), (ii) and (iii).

The polymerizable second monomer (i) represented by general formula IV may be prepared by methods that are well known in the art. One such commonly used method involves a two-step process, when the sum of m and n is greater than 0. In the first step, a polyol, e.g., 4,4'-isopropylidenediphenol, is reacted with an oxirane containing substance, for example ethylene oxide, propylene oxide, α-butylene oxide or β-butylene oxide, to form what is commonly referred to as an ethoxylated, propoxylated or butoxylated polyol having hydroxy functionality. In the second step, the ethoxylated, propoxylated or butoxylated polyol is esterified, or transesterified, with an alpha-beta unsaturated acid or ester such as methacrylic acid, a C$_1$ to C$_6$ alkyl methacrylate, an acrylic acid, a C$_1$ to C$_6$ alkyl acrylate, or a combination thereof. The second step results in the formation of the radically polymerizable monomer represented by general formula IV. When the sum of m and n is 0, monomer (i) may be prepared by esterifying or transesterfying a polyol, e.g., 4,4'-isopropylidenediphenol, with an alpha-beta unsaturated acid or ester such as methacrylic acid, a C$_1$ to C$_6$ alkyl methacrylate, an acrylic acid, a C$_1$ to C$_6$ alkyl acrylate, or a combination thereof.

Examples of polyols suitable for use in preparing second monomer (i) represented by general formula IV, include, but are not limited to: straight chain alkylene glycols such as ethylene glycol, propylene glycol, trimethylene glycol, tetramethylene glycol, or diethylene glycol, triethylene glycol; branched chain alkylene glycols such as 1,2-propanediol, 2-methyl-1,3-propanediol, 1,2-butanediol, 1,3-butanediol, 2,3-butanediol; cyclic alkylene diols such as 1,2-cyclohexanediol, 1,3-cyclohexanediol and 1,4-cyclohexanediol; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, and 4-hydroxybenzyl alcohol; dihydroxybiphenyls such as 4,4'-dihydroxybiphenyl and 2,2'-dihydroxybiphenyl; bisphenols such as 4,4'-isopropylidenediphenol; 4,4'-oxybisphenol; 4,4'-dihydroxybenzophenone; 4,4'-thiobisphenol; phenolphthalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidene-biscyclohexanol; 4,4'-oxybiscyclohexanol; 4,4'-thiobiscyclohexanol; and bis(4-hydroxycyclohexanol)methane.

In a preferred embodiment of the present invention, with reference to general formulas IV and V, X is —C(CH$_3$)$_2$—,

represents a divalent benzene group, p and q are each 0, R$_3$ and R$_4$ are each methyl, R$_5$ and R$_6$ are each hydrogen, and the sum of m and n is from 5 to 20.

Polymerizable second monomer (ii) is different than second monomer (i) and can be prepared as is known in the art from an esterification or transesterification reaction between poly(ethylene glycol) and an alpha-beta unsaturated acid or ester such as methacrylic acid, a C$_1$ to C$_6$ alkyl methacrylate, acrylic acid, a C$_1$ to C$_6$ alkyl acrylate, or a combination thereof. The bis[(meth)acryloyl-terminated]poly(ethylene glycol) monomer, preferably has a number average molecular weight from 200 to 1200, more preferably from 500 to 700, grams/mole, as determined by gel permeation chromatography using a polystyrene standard. A particularly preferred second monomer (ii) is a bismethacrylate of polyethylene glycol, having a number average molecular weight of 600 grams/mole.

Polymerizable second monomer (iii), as previously described with reference to general formula VI, may be prepared by methods that are well known in the art. One such commonly used method involves a two step process, when d is greater than 0. In the first step, a polyol, e.g., trimethylolpropane, is reacted with an oxirane containing substance, for example ethylene oxide, propylene oxide, α-butylene oxide or β-butylene oxide to form what is commonly referred to as an ethoxylated, propoxylated or butoxylated polyol having hydroxy functionality. In the second step, the ethoxylated, propoxylated or butoxylated polyol is esterified, or transesterified, with an alpha-beta unsaturated acid or ester such as methacrylic acid, a C$_1$ to C$_6$ alkyl methacrylate, acrylic acid, a C$_1$ to C$_6$ alkyl acrylate, or a combination thereof. The second step results in the formation of polymerizable second monomer (iii). When d is 0, second monomer (iii) may be prepared by esterifying or transesterifying a polyol, e.g., trimethylolpropane, with an alpha-beta unsaturated acid or ester such as methacrylic acid, a C$_1$ to C$_6$ alkyl methacrylate, an acrylic acid, a C$_1$ to C$_6$ alkyl acrylate, or a combination thereof.

Examples of polyols suitable for use in preparing polymerizable second monomer (iii) include, but are not limited to, glycerol, trimethylolpropane, 1,3,5-tris(2-hydroxyethyl)isocyanurate, di-trimethylolpropane, pentaerythritol and dipentaerythritol. A particularly preferred polymerizable second monomer (iii) may be defined with reference to general formula VI, wherein R' is a radical of pentaerythritol, d is 0, j is 3 or 4 and $R_9$ is hydrogen.

As used herein, and with reference to general formula VI, the phrase "R' is a polyvalent radical of a polyol" is meant to refer to the polyvalent residue of the polyol used in preparing polymerizable second monomer (iii). For example, in the case of pentaerythritol tetraacrylate (for which d is 0, j is four and $R_9$ is hydrogen), R' is the tetravalent radical of pentaerythritol, i.e., tetramethylenemethane. In the case of trimethylolpropane triacrylate (for which d is 0, j is 3 and $R_9$ is hydrogen) R' is the trivalent radical of trimethylolpropane, i.e., 1,1,1-trimethylenepropane.

In a further embodiment of the present invention, the polymerizable second monomer having two or more ethylenically unsaturated groups has allyl groups and is represented by the following general formula XXV,

R—[—O—C(O)—O—$R_{10}$]$_i$ (XXV)

wherein R is a radical derived from a polyol, $R_{10}$ is a radical derived from an allyl or substituted allyl group and i is a whole number from 2 to 6.

The polymerizable second monomer represented by general formula XXV, may be further described as a polyol(allyl carbonate) monomer. Polyol(allyl carbonate) monomers that may be used in the aforedescribed polymerizable organic composition are allyl carbonates of linear or branched aliphatic or aromatic liquid polyols, e.g., aliphatic glycol bis (allyl carbonate) compounds and alkylidene bisphenol bis (allyl carbonate) compounds. These monomers may also be described as unsaturated polycarbonates of polyols, e.g., glycols and bisphenols. The polyol(allyl carbonate) monomer may be prepared by procedures well known in the art, e.g., as described in U.S. Pat. Nos. 2,370,567 and 2,403,113.

In reference to general formula XXV, $R_{10}$ is a radical derived from an allyl group which may be substituted at the 2-position with a halogen, most notably chlorine or bromine, or an alkyl group containing from 1 to 4, e.g., 1 to 2, carbon atoms. Generally, the alkyl substituent is methyl or ethyl. The $R_{10}$ radical may be represented by the following general formula XXVI:

$H_2C$=C($R_{11}$)—$CH_2$— (XXVI)

wherein $R_{11}$ is hydrogen, halogen or a $C_1$ to $C_4$ alkyl group. Most commonly, $R_{11}$ is hydrogen and consequently $R_{10}$ is the unsubstituted allyl group, $H_2C$=CH—$CH_2$—.

In reference to general formula XXV, R is a polyvalent radical derived from a polyol which can be an aliphatic, cycloaliphatic or an aromatic polyol containing 2, 3, 4, 5 or 6 hydroxy groups. Typically, the polyol contains 2 hydroxy groups, i.e., a glycol or bisphenol. The aliphatic polyol may be linear or branched and contain from 2 to 10 carbon atoms. Commonly, the aliphatic polyol is an alkylene glycol having from 2 to 4 carbons atoms, ethylene glycol, propylene glycol, trimethylene glycol, tetramethylene glycol, or a poly($C_2$-$C_4$) alkylene glycol, e.g., diethylene glycol, triethylene glycol, etc. Other useful polyols include aromatic polyols such as bisphenols, e.g., 4,4'-isopropylidenediphenol, and cycloaliphatic polyols such as biscyclohexanols, e.g., 4,4'-isopropylidenebiscyclohexanol.

Specific examples of polyol(allyl carbonate) monomers that may be used in the polymerizable organic compositions of the present invention, include, but are not limited to, ethylene glycol bis(2-chloroallyl carbonate), ethylene glycol bis (allyl carbonate), diethylene glycol bis(2-methylallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4 butanediol bis(2-bromoallyl carbonate), dipropylene glycol bis(allyl carbonate), trimethylene glycol bis(2-ethylallyl carbonate), pentamethylene glycol bis (allyl carbonate), 4,4'-isopropylidenediphenol bis(allyl carbonate), and 4,4'-isopropylidenebiscyclohexanol bis(allyl carbonate). A preferred polyol(allyl carbonate) monomer is 4,4'-isopropylidenediphenol bis(allyl carbonate).

A more detailed description of polyol(allyl carbonate) monomers suitable for use in the present invention is found in U.S. Pat. No. 4,637,698 at column 3, line 33 through column 5, line 61. That disclosure is hereby incorporated by reference and is summarized above. As used in the present description with reference to general formula VII, the term polyol(allyl carbonate) monomer or like names, e.g., diethylene glycol bis(allyl carbonate), is intended to mean and include the named monomers or prepolymers thereof and any related monomer or oligomer species found with said monomer as a consequence of the process used to synthesize the monomer.

The polymerizable composition of the present invention, may optionally further comprise a third radically polymerizable monomer that is different than the first and second radically polymerizable monomers. The third radically polymerizable monomer may be selected from monoethylenically unsaturated monomers. Examples of such monoethylenically unsaturated monomers include, but are not limited to, acrylic acid, methacrylic acid, esters of acrylic acid such as methyl or ethyl acrylate and 2-hydroxyethyl acrylate, esters of methacrylic acid, such as methyl or ethyl methacrylate, phenoxyethyl methacrylate, isobornyl methacrylate, cyclohexyl methacrylate and 2-hydroxyethyl methacrylate, vinyl esters such as vinyl acetate, styrene and vinyl chloride and monoethylenically unsaturated monomers containing thiol groups, such as mercaptoethyl(meth)acrylate, vinyl mercaptan and allyl mercaptan. Preferred monoethylenically unsaturated monomers include, methyl methacrylate, isobornyl methacrylate, phenoxyethyl methacrylate, cyclohexyl methacrylate, vinyl chloride, mercaptoethyl(meth)acrylate, vinyl mercaptan and allyl mercaptan and mixtures thereof. If used in the polymerizable composition, third monomer (c)(i) is typically present in an amount of not greater than 30% by weight, preferably not greater than 20% by weight, and more preferably not greater than 10% by weight, based on the total weight of the polymerizable composition.

Further optionally included in the compositions of the present invention is an anhydride monomer having at least one polymerizable ethylenically unsaturated group, preferably a radically polymerizable group, which is described in the discussion of third monomer (c)(ii) above. Specific examples of suitable anhydride monomers include, but are not limited to, methacrylic anhydride, acrylic anhydride, maleic anhydride, 1-cyclopentene-1,2-dicarboxylic anhydride, itaconic anhydride and mixtures of such anhydride monomers. If used in the polymerizable composition, anhydride monomer (c)(ii) is typically present in an amount of not greater than 40% by weight, preferably not greater than 35% by weight and more preferably not greater than 30% by weight, based on the total weight of the polymerizable composition.

The polymerizable composition of the present invention, may yet further optionally comprise a polythiol monomer (d) having at least two thiol groups. The polythiol monomer (d) may be selected from any one or more of those polythiol monomers as recited and described previously herein with regards to the preparation the precursor of the first monomer.

Polymerization of the polymerizable organic composition of the present invention may be accomplished by adding to the composition an initiating amount of material capable of generating free radicals, such as organic peroxy compounds or azobis(organonitrile) compounds, i.e., an initiator. Methods for polymerizing compositions having therein monomers containing radically polymerizable groups are well known to the skilled artisan and any of those well known techniques may be used to polymerize the aforedescribed polymerizable organic compositions. Such polymerization methods include thermal polymerization, photopolymerization or a combination thereof.

Examples of suitable organic peroxy compounds, that may be used as thermal polymerization initiators include: peroxymonocarbonate esters, such as tertiarybutylperoxy 2-ethylhexyl carbonate and tertiarybutylperoxy isopropyl carbonate; peroxyketals, such as 1,1-di-(t-butyl peroxy)-3,3,5-trimethylcyclohexane; peroxydicarbonate esters, such as di(2-ethylhexyl) peroxydicarbonate, di(secondary butyl)peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide. Preferred thermal initiators are those that do not discolor the resulting polymerizate. A particularly preferred thermal initiator is 1,1-di-(t-butyl peroxy)-3,3,5-trimethylcyclohexane, which is commercially available from Elf Atochem under the tradename LUPERSOL 231.

Examples of suitable azobis(organonitrile) compounds, that may be used as thermal polymerization initiators include: azobis(isobutyronitrile) and azobis(2,4-dimethylvaleronitrile).

The amount of thermal polymerization initiator used to initiate and polymerize the polymerizable organic compositions of the present invention may vary and will depend on the particular initiator used. Only that amount that is required to initiate and sustain the polymerization reaction is required, i.e., an initiating amount. With respect to the preferred peroxy compound, 1,1-di-(t-butyl peroxy)-3,3,5-trimethylcyclohexane, typically between 0.01 and 3.0 parts of that initiator per 100 parts of monomers (phm) present in the polymerizable organic composition may be used. More usually, between 0.05 and 1.0 phm is used to initiate the polymerization. Typically, the thermal cure cycle involves heating the polymerizable organic composition in the presence of the initiator from room temperature to 85° C. to 130° C. over a period of from 2 hours to 48 hours.

Photopolymerization of the polymerizable organic composition according to the present invention may be carried out in the presence of a photopolymerization initiator using ultraviolet light, visible light, or a combination thereof. Examples of suitable photopolymerization initiators include benzoin, benzoin methyl ether, benzoin isobutyl ether, benzophenone, acetophenone, 4,4'-dichlorobenzophenone, diethoxyacetophenone, 2-hydroxy-2-methyl-1-phenylpropan-1-one, 1-hydroxycyclohexyl phenyl ketone, 2-isopropylthixanthone and 2,4,6-trimethylbenzoyldiphenylphosphine oxide. The amount of photopolymerization initiator used to initiate and polymerize the polymerizable organic compositions of the present invention vary and will depend on the particular initiator used. Only that amount that is required to initiate and sustain the polymerization reaction is required, i.e., an initiating amount. A preferred photopolymerization initiator is 2,4,6-trimethylbenzoyldiphenylphosphine oxide. The photopolymerization initiator is typically used in an amount from 0.01% to 2% by weight, based on the total weight of monomer components.

The light source used for the photopolymerization is preferably selected from those which emit ultraviolet light. The light source is preferably a mercury lamp, a germicidal lamp or a xenon lamp. Visible light, e.g., sunlight, may also be used. The exposure time may differ depending upon, e.g., the wavelength and intensity of the light source and the shape of the mold, and is typically determined empirically.

The amount of thermal polymerization initiator or photopolymerization initiator and/or the consequent cure cycle should be adequate to produce a polymerizate according to the present invention which has an initial (zero second) Barcol hardness of at least 1, preferably at least 4, e.g., from 4 to 35.

It should be understood that the polymerizable organic composition of the present invention may be polymerized in the absence of a polymerization initiator. In particular, photopolymerization of the polymerizable organic composition of the present invention may be achieved in the absence of any externally added photopolymerization or thermal initiators.

Various conventional additives may be incorporated with the polymerizable organic composition of the present invention. Such additives may include light stabilizers, heat stabilizers, antioxidants, ultraviolet light absorbers, mold release agents, static (non-photochromic) dyes, pigments, polymerization inhibitors to promote stability during storage, and flexibilizing additives that are not radically polymerizable, e.g., alkoxylated phenol benzoates and poly(alkylene glycol) dibenzoates. Anti-yellowing additives, e.g., 3-methyl-2-butenol, organo pyrocarbonates and triphenyl phosphite (CAS registry no. 101-02-0), may also be added to polymerizable organic compositions of the present invention to enhance resistance to yellowing. Such additives are typically present in the compositions of the present invention in amounts totaling less than 10% by weight, preferably less than 5% by weight, and more preferably less than 3% by weight, based on the total weight of the polymerizable composition.

It is also contemplated that a polymerization moderator, or mixtures of polymerization moderators, may be added to the polymerizable organic composition of the present invention to minimize the formation of distortions, such as striations, in polymerizates obtained therefrom. Suitable polymerization moderators include for example, dilauryl thiodipropionate, terpinolene, 1-isopropyl-4-methyl-1,4-cyclohexadiene, 1-isopropyl-4-methyl-1,3-cyclohexadiene, alpha-methyl styrene, 2,4-diphenyl-4-methyl-1-pentene, 1,1-diphenylethylene, cis-1,2-diphenylethylene, 2,6-dimethyl-2,4,6-octatriene, 4-tert-butylpyrocatechol, and mixtures thereof. The polymerization moderator may be added to the polymerizable organic composition of the present invention in an amount from 0.01 percent to 10 percent by weight, preferably from 0.1 percent to 8 percent by weight and more preferably from 0.3 percent to 5 percent by weight, based on the total weight of the polymerizable organic composition.

Polymerizates obtained from polymerization of polymerizable organic compositions of the present invention will be solid, and preferably transparent, e.g., suitable for optical or ophthalmic applications. The polymerizates of the present invention will also have a refractive index of from about 1.57 to about 1.80, preferably about 1.60 to about 1.75; an adequately high Abbe number, such as an Abbe number of at least about 30, preferably at least about 33; and an initial (zero second) Barcol hardness of at least 1. More preferably, the refractive index will be at least 1.6, even more preferably at least 1.63 and most preferably at least 1.65, and have a more preferable Abbe number of at least 35. Solid articles that may be prepared from polymerizable organic compositions of the present invention include, but are not limited to, optical lenses, such as plano and ophthalmic lenses, sun lenses, windows, automotive transparencies, e.g., windshields, sidelights and backlights, and aircraft transparencies, etc.

When used to prepare photochromic articles, e.g., lenses, the polymerizate should be transparent to that portion of the electromagnetic spectrum which activates the photochromic substance(s) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form. Photochromic substances that may be utilized with the polymerizates of the present invention are organic photochromic compounds or substances containing same that may be incorporated, e.g., dissolved, dispersed or diffused into such polymerizates.

A first group of organic photochromic substances contemplated for use to form the photochromic articles of the present invention are those having an activated absorption maximum within the visible range of greater than 590 nanometers, e.g., between greater than 590 to 700 nanometers. These materials typically exhibit a blue, bluish-green, or bluish-purple color when exposed to ultraviolet light in an appropriate solvent or matrix. Examples of classes of such substances that are useful in the present invention include, but are not limited to, spiro(indoline)naphthoxazines and spiro(indoline)benzoxazines. These and other classes of such photochromic substances are described in the open literature. See for example, U.S. Pat. Nos. 3,562,172; 3,578,602; 4,215,010; 4,342,668; 5,405,958; 4,637,698; 4,931,219; 4,816,584; 4,880,667; 4,818,096. Also see for example: Japanese Patent Publication 62/195383; and the text, *Techniques in Chemistry*, Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567, 605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic substances contemplated are photochromic organo-metal dithizonates, i.e., (arylazo)-thioformic arylhydrazidates, e.g., mercury dithizonates, which are described in, for example, U.S. Pat. No. 3,361,706. Fulgides and fulgimides, e.g. the 3-furyl and 3-thienyl fulgides and fulgimides, are described in U.S. Pat. No. 4,931,220 at column 20, line 5 through column 21, line 38.

The disclosures relating to such photochromic substances in the aforedescribed patents are incorporated herein, in toto, by reference. The photochromic articles of the present invention may contain one photochromic substance or a mixture of photochromic substances, as desired. Mixtures of photochromic substances may be used to attain certain activated colors such as a near neutral gray or brown.

Each of the photochromic substances described herein may be used in amounts and in a ratio (when mixtures are used) such that a polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic substances. The relative amounts of the aforesaid photochromic substances used will vary and depend in part upon the relative intensities of the color of the activated species of such compounds, and the ultimate color desired.

The photochromic compounds or substances described herein may be applied to or incorporated into the polymerizate by various methods described in the art. Such methods include dissolving or dispersing the substance within the polymerizate, e.g., imbibition of the photochromic substance into the polymerizate by immersion of the polymerizate in a hot solution of the photochromic substance or by thermal transfer; providing the photochromic substance as a separate layer between adjacent layers of the polymerizate, e.g., as a part of a polymer film or polymer layer; and applying the photochromic substance as a coating or as part of a coating or polymer layer placed on the surface of the polymerizate. The term "imbibition" or "imbibe" is intended to mean and include permeation of the photochromic substance alone into the polymerizate, solvent assisted transfer absorption of the photochromic substance into a porous polymer, vapor phase transfer, and other such transfer mechanisms. One example of an imbibing method includes the steps of coating the photochromic article with the photochromic substance; heating the surface of the photochromic article; followed by removing the residual coating from the surface of the photochromic article.

The amount of photochromic substance or composition containing same applied to or incorporated into the polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polymerizate may range from 0.15 to 0.35 milligrams per square centimeter of surface to which the photochromic substance(s) is incorporated or applied.

It is also contemplated that photochromic substances may be added to the polymerizable organic compositions of the present invention prior to curing. However, when this is done it is preferred that the photochromic substance(s) be resistant to potentially adverse interactions with initiator(s) that may be present and/or the polythiol monomer and the sulfide linkages that form within the polymerizate. These adverse interactions can result in deactivation of the photochromic substance(s), e.g., by trapping them in either an open or closed form. Photochromic substances can also include photochromic pigments and organic photochromic substances encapsulated in metal oxides, the latter of which are described in U.S. Pat. Nos. 4,166,043 and 4,367,170. Organic photochromic substances sufficiently encapsulated within a matrix of an organic polymerizate, as described in U.S. Pat. No. 4,931,220, may also be incorporated into the polymerizable organic compositions of the present invention prior to curing.

EXAMPLE 1

Thioglycerol bis(2-mercaptoacetate) is a preferred polythiol monomer of the present invention, in which $R_1$ and $R_2$ are each methylene with reference to general formula I. Thioglycerol bis(2-mercaptoacetate) was prepared from the following ingredients.

| Ingredient | Amount (grams) |
| --- | --- |
| Charge 1 | |
| 3-mercapto-1,2-propanediol | 1995 |
| 2-mercaptoacetic acid | 2333 |
| methane sulfonic acid | 14.2 |
| Charge 2 | |
| aqueous ammonia (a) | 4218 |

(a) An aqueous solution of 5% by weight ammonia.

The ingredients of Charge I were added to a five liter round bottom flask equipped with a magnetic stirrer, a thermocouple and heating mantle coupled through a temperature feed-back control device, and a vacuum distillation column. A vacuum of from 5 to 10 millimeters (mm) of Hg was drawn and the reaction mixture was heated to and held at 70° C. for a period of 4 to 5 hours while water was collected from the distillation column.

When no more water was observed to be collected from the distillation column, the reaction mixture was cooled to room temperature and transferred to a six liter round bottom flask equipped with a motor driven stir-blade, a thermocouple and a water cooled jacket. Charge 2 was added to the mixture, which was then stirred for 30 to 45 minutes with an accompanying exotherm of from 10° C. to 20° C. Upon cooling to room temperature, the reaction mixture was left standing to allow the accumulation of an upper ammonia layer, which was removed by suctioning with a pipette. The remaining lower layer was washed three times each with two liters of deionized water. Vacuum stripping of water from the washed layer yielded 1995 grams of thioglycerol bis(2-mercaptoacetate) in the form of a yellowish oil having a refractive index of 1.5825.

EXAMPLE 2

This example demonstrates the synthesis of an UV-curable thiourethane monomer of the present invention. In a reaction vessel equipped with mixing, a thermometer and a water-cooled reflux condenser, 1 equivalent of tolylene-2,4-diisocyanate (TDI) was mixed with 3 equivalents of 2,2'-thiodiethanethiol (DMDS) under ambient conditions for 16 hours to yield a liquid thiourethane prepolymer. 1 equivalent of the prepolymer was warmed, to which was added 1 equivalent of isocyanatoethyl methacrylate. The resulting mixture was stirred for 1.5 hours at 70° C. to yield a clear, viscous monomer.

EXAMPLE 3

This example demonstrates the synthesis of a polymerizate prepared using the UV-cured thiourethane monomer of Example 2. The casting composition for the polymerizate was as follows:

| Component | Composition (weight %) |
| --- | --- |
| Thiourethane monomer | 35 |
| Bisphenol A 2EO dimethacrylate | 30 |
| Styrene | 30 |
| 2,2'-thiodiethanethiol | 5 |
| Darocure 4265 initiator[1] | Q.S. |

[1] a mixture of 2-hydroxy-2-methyl-1-phenyl-1-propanone and diphenyl-2,4,6-trimethyl benzyl phosphine oxide available from Ciba Specialty Chemicals, Basel, Switzerland.

The components were charged to a vessel and mixed for several minutes. The mixture was placed between two flat UV-transmissive glass molds with a cavity thickness of 3.2 mm. The mixture in the mold was photopolymerized by passing the mold under an UV light source. The filled mold was passed under the UV light a first time, exposing a first side of the mold to the UV light source. The mold was then turned over, and was passed under the UV light a second time, exposing a second and opposite side of the mold to the UV light source. The mold was then held at 120° C. for one hour and afterwards allowed to cool to ambient temperature. A solid polymer sheet was recovered from the mold, which had a refractive index (D-line, 20° C.) of 1.60, Abbe number of 34 to 35, and an initial Barcol 934 hardness of 18.

The invention has been described with reference to the preferred embodiments. Obvious modifications and alterations will occur to others upon reading and understanding the detailed description. It is intended that the invention be construed as including all such modifications and alterations insofar as they come within the scope of appended claims or the equivalents thereof.

We claim:

1. A polymerizable organic composition comprising one or more radically polymerizable monomers, at least one of which is a first monomer having at least two (meth)acryloyl groups and comprising one or more backbone linkages selected from the group consisting of thiourethane linkages and dithiourethane linkages, wherein a precursor of said first monomer is prepared from the reaction of a reactive hydrogen material comprising a polythiol having at least two thiol groups, and a monomer having at least two functional groups selected from at least one of the group consisting of isocyanate and isothiocyanate, and wherein the reactive hydrogen material further comprises a polyamine selected from the group consisting of ethyleneamines, $C_1$-$C_3$ dialkyl toluenediamine, methylene dianiline, trimethyleneglycol di(para-aminobenzoate), a diamine represented by the general formula (A):

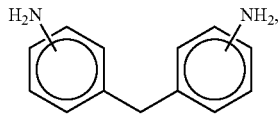

a diamine represented by the general formula (B):

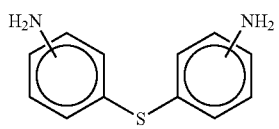

and a diamine represented by the general formula (C):

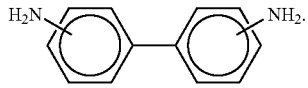

2. The polymerizable composition of claim 1 wherein the polyamine comprises a diamine selected from one or more of the group consisting of:

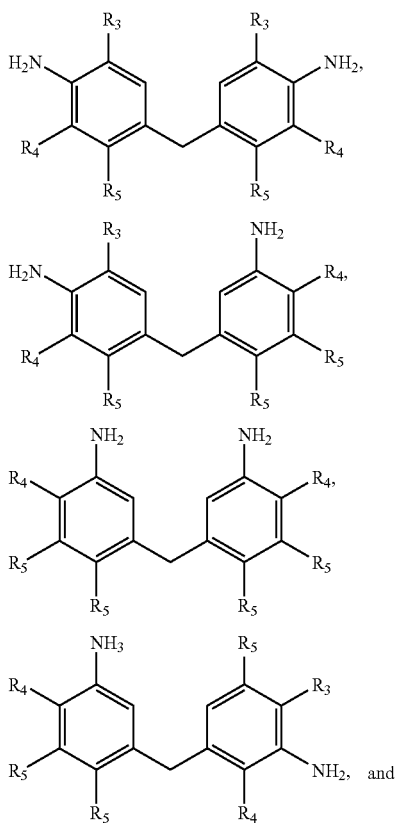

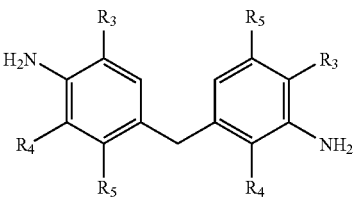

wherein $R_3$ and $R_4$ are each independently $C_1$-$C_3$ alkyl, and $R_5$ is selected from hydrogen and halogen, and mixtures of said diamines.

3. The polymerizable composition of claim 1 wherein the polyamine comprises a diamine selected from one or more of the group consisting of:

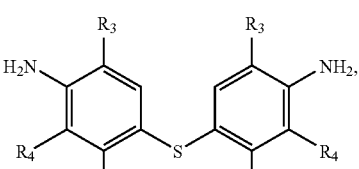

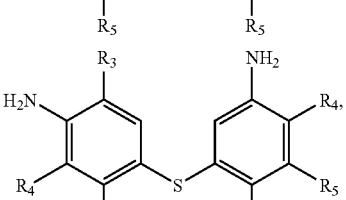

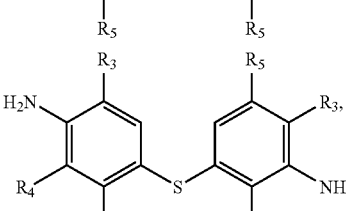

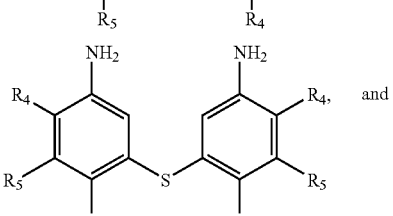

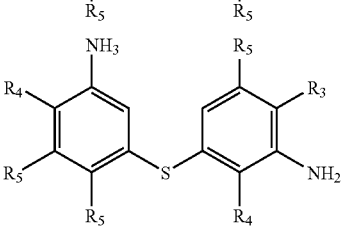

wherein $R_3$ and $R_4$ are each independently $C_1$-$C_3$ alkyl, and $R_5$ is selected from hydrogen and halogen, and mixtures of said diamines.

4. The polymerizable composition of claim 1 wherein the polyamine comprises a diamine selected from one or more of the group consisting of:

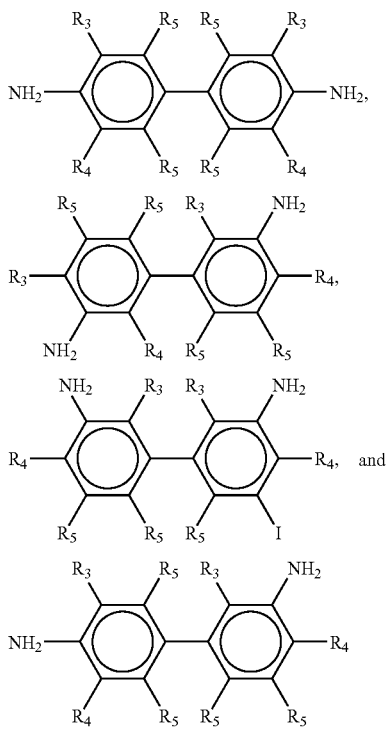

wherein $R_3$ and $R_4$ are each independently $C_1$-$C_3$ alkyl, and $R_5$ is selected from hydrogen and halogen, and mixtures of said diamines.

5. A polymerizate formed by polymerizing the polymerizable organic composition of claim 1.

6. The polymerizate of claim 5 wherein the reactive hydrogen-containing material comprises a diamine selected from one or more of the group consisting of:

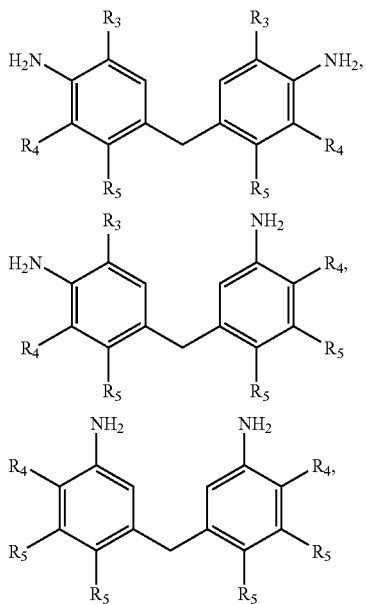

(VIII)

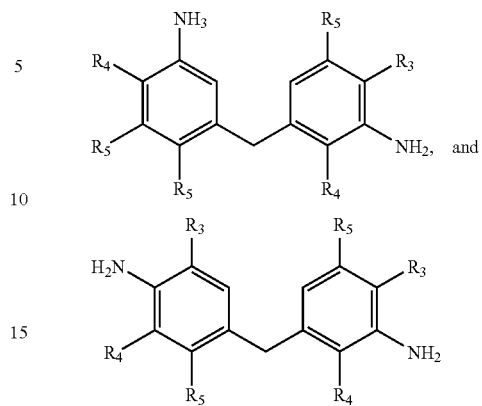

wherein $R_3$ and $R_4$ are each independently $C_1$-$C_3$ alkyl, and $R_5$ is selected from hydrogen and halogen, and mixtures of said diamines.

7. The polymerizate of claim 5 wherein the reactive hydrogen-containing material comprises a diamine selected from one or more of the group consisting of:

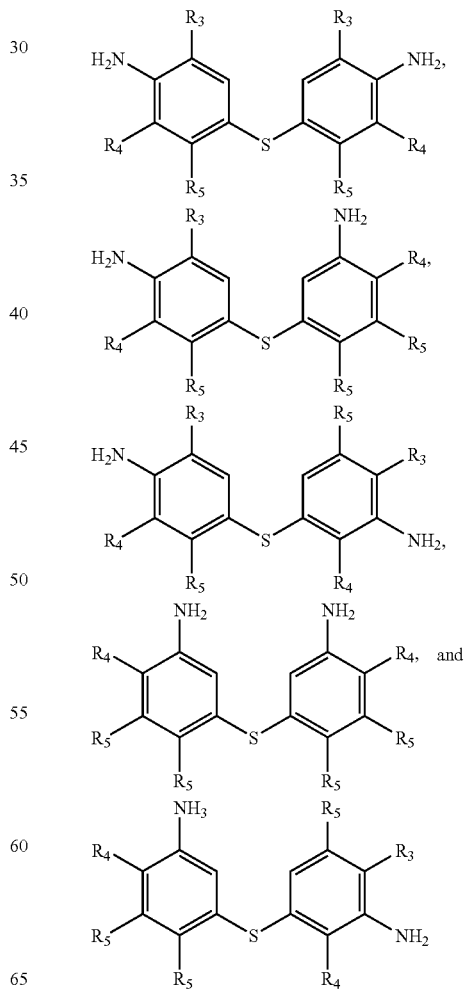

wherein $R_3$ and $R_4$ are each independently $C_1$-$C_3$ alkyl, and $R_5$ is selected from hydrogen and halogen, and mixtures of said diamines.

8. The polymerizate of claim 5 wherein the reactive hydrogen-containing material comprises a diamine selected from one or more of the group consisting of:

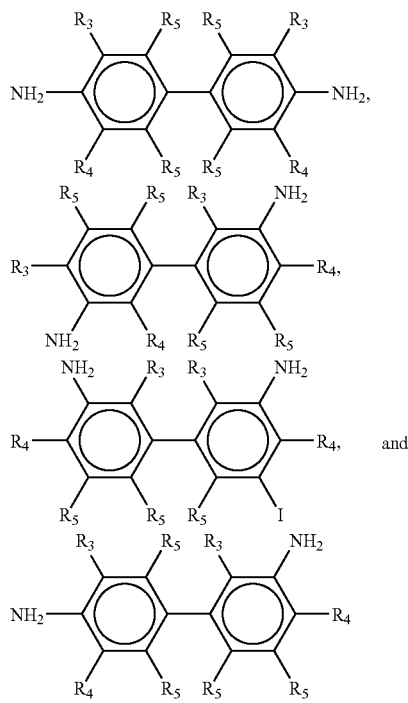

wherein $R_3$ and $R_4$ are each independently $C_1$-$C_3$ alkyl, and $R_5$ is selected from hydrogen and halogen, and mixtures of said diamines.

9. A polymerizable organic composition comprising one or more radically polymerizable monomers, at least one of which is a first monomer having at least two (meth)acryloyl groups and comprising one or more backbone linkages selected from thiourethane linkages and dithiourethane linkages,
wherein a precursor of said first monomer is prepared from the reaction of a reactive hydrogen material and a monomer having at least two functional groups selected from at least one of the group consisting of isocyanate and isothiocyanate,
wherein the reactive hydrogen material comprises
(a) a polythiol monomer; and/or
compounds having one or more thiol groups and one or more hydroxyl groups,
(b) a material comprising at least two primary amine groups and/or secondary amine groups, and
(c) optionally, a material comprising at least two hydroxyl groups.

10. The polymerizable composition of claim 9 wherein the thiol groups of said polythiol comprise at least 50 mole percent, based on the total molar equivalents of thiol groups, hydroxyl groups, primary amine groups and secondary amine groups of said polythiol monomer and said reactive hydrogen material.

11. The polymerizate of claim 9 wherein the thiol groups of said polythiol monomer comprises at least 50 mole percent, based on the total molar equivalents of thiol groups, hydroxyl groups, primary amine groups and secondary amine groups of said polythiol monomer and said reactive hydrogen material.

12. A polymerizable organic composition comprising one or more radically polymerizable monomers, at least one of which is a first monomer having at least two (meth)acryloyl groups and comprising one or more backbone linkages selected from the group consisting of thiourethane linkages and dithiourethane linkages,
wherein a precursor of said first monomer is prepared from the reaction of (a) a reactive hydrogen material comprising a polythiol monomer having at least two thiol groups, and (b) a monomer having the general structure:

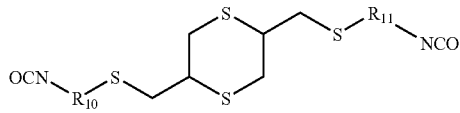

wherein $R_{10}$ and $R_{11}$ are each independently $C_1$ to $C_3$ alkyl, and wherein a polymerizate of said polymerizable organic composition has a refractive index of from about 1.57 to about 1.80.

13. A polymerizate formed by polymerizing a polymerizable organic composition comprising one or more radically polymerizable monomers, at least one of which is a first monomer having at least two (meth)acryloyl groups and comprising one or more backbone linkages selected from the group consisting of thiourethane linkages and dithiourethane linkages,
wherein a precursor of said first monomer is prepared from the reaction of a reactive hydrogen material comprising (a) a polythiol monomer having at least two thiol groups, and (b) a monomer having the general structure:

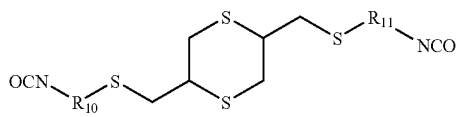

wherein $R_{10}$ and $R_{11}$ are each independently $C_1$ to $C_3$ alkyl, and
wherein the polymerizate has a refractive index of from about 1.57 to about 1.80.

* * * * *